United States Patent
Okuyama (10) Patent No.: US 7,948,530 B2
(45) Date of Patent: May 24, 2011

(54) SEMICONDUCTOR SENSOR DEVICE HAVING A CORRECTION CIRCUIT

(75) Inventor: Kuniyuki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 620 days.

(21) Appl. No.: 09/796,249

(22) Filed: Feb. 28, 2001

(65) Prior Publication Data

US 2001/0050366 A1    Dec. 13, 2001

(30) Foreign Application Priority Data

Mar. 1, 2000 (JP) .................................. 2000-055205

(51) Int. Cl.
  *H01L 29/04* (2006.01)
(52) U.S. Cl. .................. 348/241; 257/72; 257/E31.085; 348/294
(58) Field of Classification Search .............. 257/72, 257/59, 292, 293, 296, 290, 443, E31.058, 257/48, 253, E21.521, 232, 294, 239; 348/272, 348/277, 246, 294, 241, 300, 308, 302, 305; 438/14–18; 250/214 R, 214 AG, 214 C, 250/332, 338.1, 340, 349, 338.4
See application file for complete search history.

(56) References Cited

U.S. PATENT DOCUMENTS

| | | | | |
|---|---|---|---|---|
| 5,625,210 A | * | 4/1997 | Lee et al. | 257/292 |
| 6,061,093 A | * | 5/2000 | Yonemoto | 348/305 |
| 6,441,411 B2 | * | 8/2002 | Nozaki et al. | 257/292 |

FOREIGN PATENT DOCUMENTS

| | | |
|---|---|---|
| JP | 9-284651 | 10/1997 |
| JP | 10-304251 | 11/1998 |
| JP | 11-150683 | 6/1999 |
| JP | 2000-106651 | 4/2000 |
| JP | 2000-165748 | 6/2000 |

OTHER PUBLICATIONS

IEEE Technical Report, ED98-265, pp. 9-16 by Tanaka et al.

* cited by examiner

*Primary Examiner* — Tom Thomas
*Assistant Examiner* — Hoa B Trinh
(74) *Attorney, Agent, or Firm* — Scully, Scott, Murphy & Presser, P.C.

(57) ABSTRACT

An imaging device includes a read circuit having a bias circuit for biasing the signal currents output from a sensor array to correct variations of the sensor array. The bias current is determined so that the number of pixel data output from the read circuit which are below or above the threshold is equal to a specified number setting for the number of pixel data. A fixed pattern noise (FPN) correction circuit determines the full scale of the FPN correction current based on the bias current.

5 Claims, 11 Drawing Sheets

SEMICONDUCTOR SENSOR DEVICE HAVING A CORRECTION CIRCUIT

BACKGROUND OF THE INVENTION

1. Field of the Invention

The present invention relates to a semiconductor sensor device having a correction circuit and, more particularly, to the structure a read circuit having a correction circuit for correcting or compensating variations of the sensor array.

2. Description of the Related Art

A read circuit having a bias circuit is used in a semiconductor sensor device having a sensor array such as an infrared-ray imaging device. Patent Publication JP-A-11-150683 describes a conventional imaging device shown in FIG. 1. The imaging device includes an array of thermocouples (thermoelectric sensor) 1101, an array of switches 1100 each connected serially with a corresponding one of the thermocouples 1101, and a read circuit including an emitter follower having a PNP transistor 1104 and an NPN transistor 1102, and a resistor 1103, for detecting the resistances of the thermocouples 1101.

Figure 1:
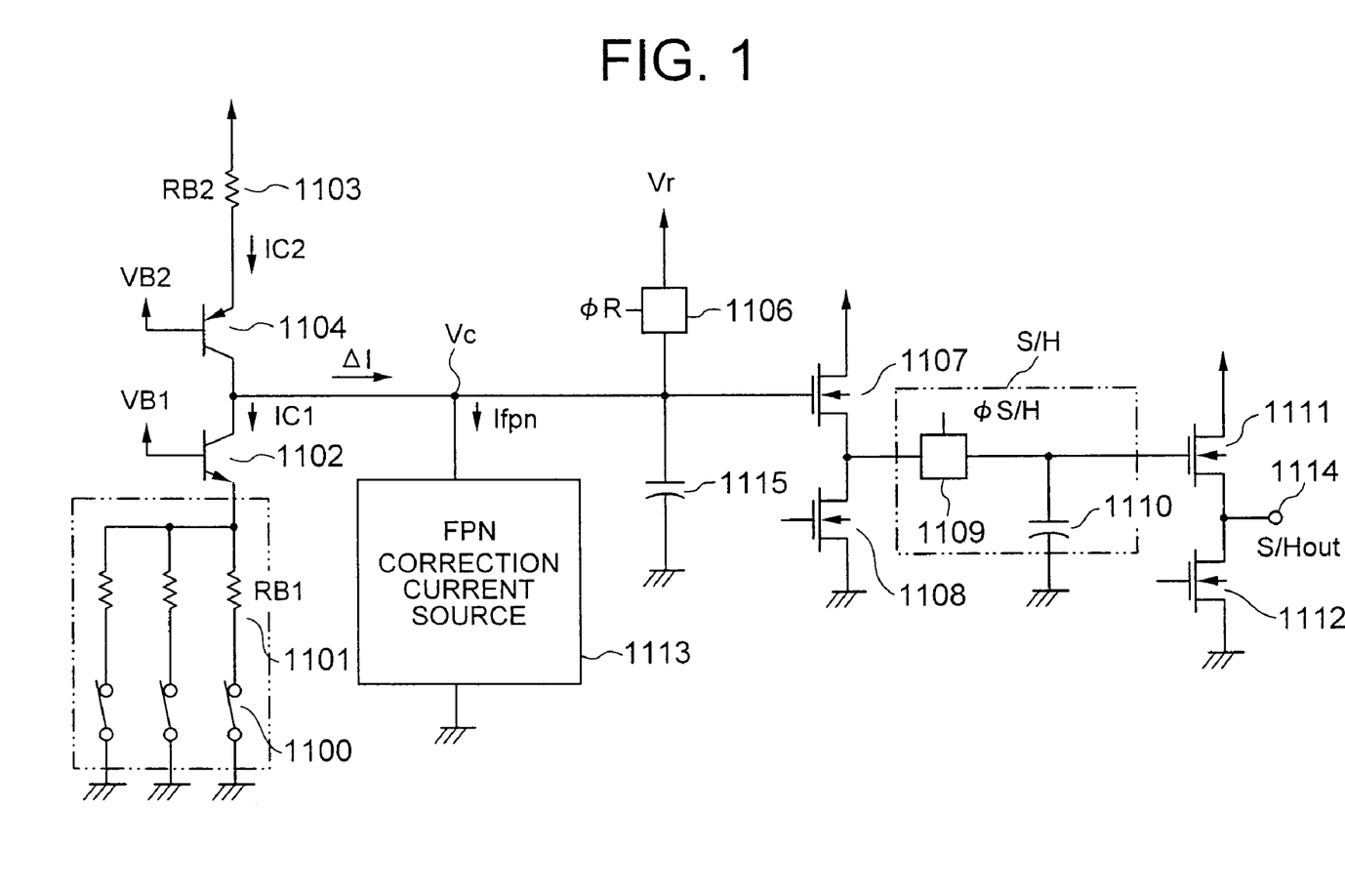
FIG. 1 is a circuit diagram of a conventional semiconductor imaging device.

The read circuit of the imaging device further includes a FPN correction current source 1113, for conducting a correction current from a first node connecting the collectors of the transistors 1104 and 1102 together, an integration capacitor 1105 connected across the first node and the ground, a reset switch 1106 for connecting the voltage source Vr and the first node, source follower transistors 1107 and 1108 receiving a gate signal from the first node, a sample/hold circuit including a switch 1109 and a capacitor 1110 for receiving a signal from the source follower transistors 1107 and 1108, and output source follower transistors 1111 and 1112 for receiving a signal from the sample/hold circuit to output the pixel, data read from the thermocouples 1101.

The thermocouple 1101 is a titanium bolometer which changes the electric resistance thereof depending on the temperature. The titan bolometer is sensitive to an incident infrared ray. When a bias voltage VB1 is applied to NPN transistor 1102, a voltage of (VB1−VBE) is applied across the titan bolometer, wherein VBE is the base-emitter voltage of NPN transistor 1102. Thus, a collector current of IC1=(VB1−VBE)/RB1 flows toward NPN transistor 1102, given RB1 being the resistance of the titan bolometer 1101.

The resistance RB2 of resistor 1103 is used as a reference resistor for the titan bolometer 1101. A bias voltage of VB2 applied to PNP transistor 1104 allows a collector current of IC2=(VB2−VBE)/RB2 to flow toward NPN transistor 1104.

While an infrared ray is not incident onto the bolometer, the base voltage of transistor 1104 is controlled so that both the currents IC1 and IC2 are balanced to each other. In this case, a current hardly flows toward the integration, capacitor 1105. When an infrared ray is incident onto the bolometer 1101, the temperature of a diaphragm which is thermally isolated rises, whereby the resistance, of the titan bolometer 1101 mounted on the diaphragm is changed. The change of the resistance changes the current IC1, whereas the current IC2 does not change because the resistance of the resistor 1103 formed by diffusion does not change. The change of IC1 generates a current difference ΔI wherein ΔI=IC2−IC1, which stores electric charge on the integration capacitor 105. The current difference ΔI includes a signal component from the titan bolometer 1101 and a noise component of the bias current although a larger component of the bias current is removed therefrom.

In the imaging device of FIG. 1, if the variations of the resistance RB1 between the pixels are large, the FPN (fixed pattern noise) correction circuit which includes elements 1106 to 1108 allows a specified correction current $I_{fpn}$ to flow for each of the pixels. That is, if resistance RB1 of the titan bolometer is larger than the standard resistance, the current IC1 flowing through the bolometer is smaller, whereby the current difference ΔI=IC2−IC1 assumes a larger value. The correction current $I_{fpn}$ reduces the effective current for IC2 which is equal to IC2−$I_{fpn}$, whereby the difference of resistance RB1 is compensated by the correction current $I_{fpn}$.

The signal charge stored on the integration capacitor 1105 is applied to the source follower transistors 1107 and 1108, which convert the high impedance signal of the first node to a lower impedance signal. The sample/hold circuit samples and holds a time series signal, and delivers the sampled signals through the output source follower transistors 1111 and 1112 as S/Hout signals. The switch 1109 is implemented as a transfer gate including an nMOSFET and a pMOSFET connected in parallel.

In the conventional imaging device as described above, the FPN correction current $I_{fpn}$ can correct the resistance variations if the thermocouple has a larger resistance RB1 compared to the standard resistance. However, if the thermocouple has a lower resistance RB1 compared to the standard resistance, or if the thermocouple has an excessively larger resistance which cannot be compensated by the full-scale correction current $I_{fpn}$, canceling current for canceling the variations must be manually adjusted, if the imaging device has an adjustment element for adjusting the canceling current. The manual adjustment of the canceling current is a time-consuming work, however. If the imaging device has no such an adjustment element for the canceling current, the compensation of the smaller resistance or the excessively larger resistance cannot be compensated, whereby it is difficult to raise the amplification factor for the detected signal.

In general, the imaging device having a plurality of pixels involves variations between pixel data. This is noticeable in the case of an infrared-ray imaging device or an amplification type imaging device. The causes of the variations between the pixels include variations of the detectors such as bolometers, and the threshold voltage or parasitic capacitance of the amplifying circuit. In the case of the infrared-ray imaging device having bolometers, the resistance of the bolometer varies within several percents to several tens of percents due to the variations of the thickness or specific resistance of the bolometer film, and variations in the dimensions of the bolometer after the patterning.

Those variations impede the imaging device from reading an accurate signal. For example, the signal difference of the bolometer is as low as 1 m° C. in terms of signal temperature for a temperature difference of 1° C. of an object. In this case, the resistance change of the bolometer is as low as around 0.001 percent, assuming that the bolometer has a resistance temperature coefficient of 1%/° C. In such a case, the small signal is preferably amplified in the imaging device; however, the larger variations limit the dynamic range of the amplifier whereby the amplification factor is restricted.

SUMMARY OF THE INVENTION

In view of the above problems in the conventional semiconductor device having an imaging device, it is an object of the present invention to provide a semiconductor sensor device having a read circuit which is capable of correcting variations of the output signals from the sensors in the case of higher or lower resistance, or in the case of excessively higher or lower variations, thereby allowing the output signals to reside within the dynamic range of the read circuit.

The present invention provides a semiconductor sensors device including a plurality of sensor elements, a signal read circuit for reading levels of output signals from the sensor elements to output pixel data for the sensor elements, the signal read circuit having a bias circuit for supplying a bias signal to the output signals, a first comparator for comparing the pixel data against a specified threshold level to output result signals having "1" or "0", a counter for counting a number of the result signals for the pixel data, a second comparator for comparing the number of the result signals against a specified number, and a bias controller for controlling the bias signal so that the number of the result signals becomes substantially equal to the specified number.

The present invention also provides semiconductor sensor device comprising a plurality of sensor elements, a signal read circuit for reading levels of output signals from the sensor elements to output pixel data for the sensor elements, the signal read circuit having a bias circuit for supplying a bias signal to the output signals, a fixed pattern noise (FPN) correction circuit for correcting the pixel data by using FPN correction data, a first comparator for comparing the pixel data against a threshold level to output result signals having "1" or "0", a counter for counting a number of the result signals for the pixel data, and a bias controller for determining the bias signal at a first value so that first the number of the results signals counted based on the first value becomes substantially equal to second the number of the result signals counted based on a second value which is obtained based on the first value and a full scale of the FPN correction data.

The present invention also provides a method for controlling a semiconductor sensor device having a plurality of sensor elements, a signal read circuit for reading levels of output signals from the sensor elements to output pixel data for the sensor elements, the signal read circuit having a bias circuit for supplying a bias signal to the output signals, the method including the steps of:

comparing the pixel data against a specified threshold level to output result signals having "1" or "0";

counting a number of the result signals for the pixel data;

comparing the number of the result signals against a specified number; and controlling the bias signal so that the number of the result signals becomes substantially equal to the specified number.

The present invention also provides a method for controlling semiconductor sensor device having a plurality of sensor elements, a signal read circuit for reading levels of output signals from the sensor elements to output pixel data for the sensor elements, the signal read circuit having a bias circuit for supplying a bias signal to the output signals, and a fixed pattern noise (FPN) correction circuit for correcting the pixel data by using FPN correction data, the method including the steps of:

comparing the pixel data against a threshold level to output result signals having "1" or "0";

counting a number of the result signals for the pixel data; and determining the bias signal at a first value so that first the number of the results signals counted based on the first value becomes substantially equal to second the number of the result signals counted based on a second value which is obtained based on the first value and a full scale of the FPN correction data.

In accordance with the present invention, variations of the sensor elements can be compensated by the bias signal and/or the FPN correction data for the read circuit of the imaging device in the case of larger variations of the pixel data or irrespective of the directions of the variations.

PREFERRED EMBODIMENTS OF THE INVENTION

Figure 2:
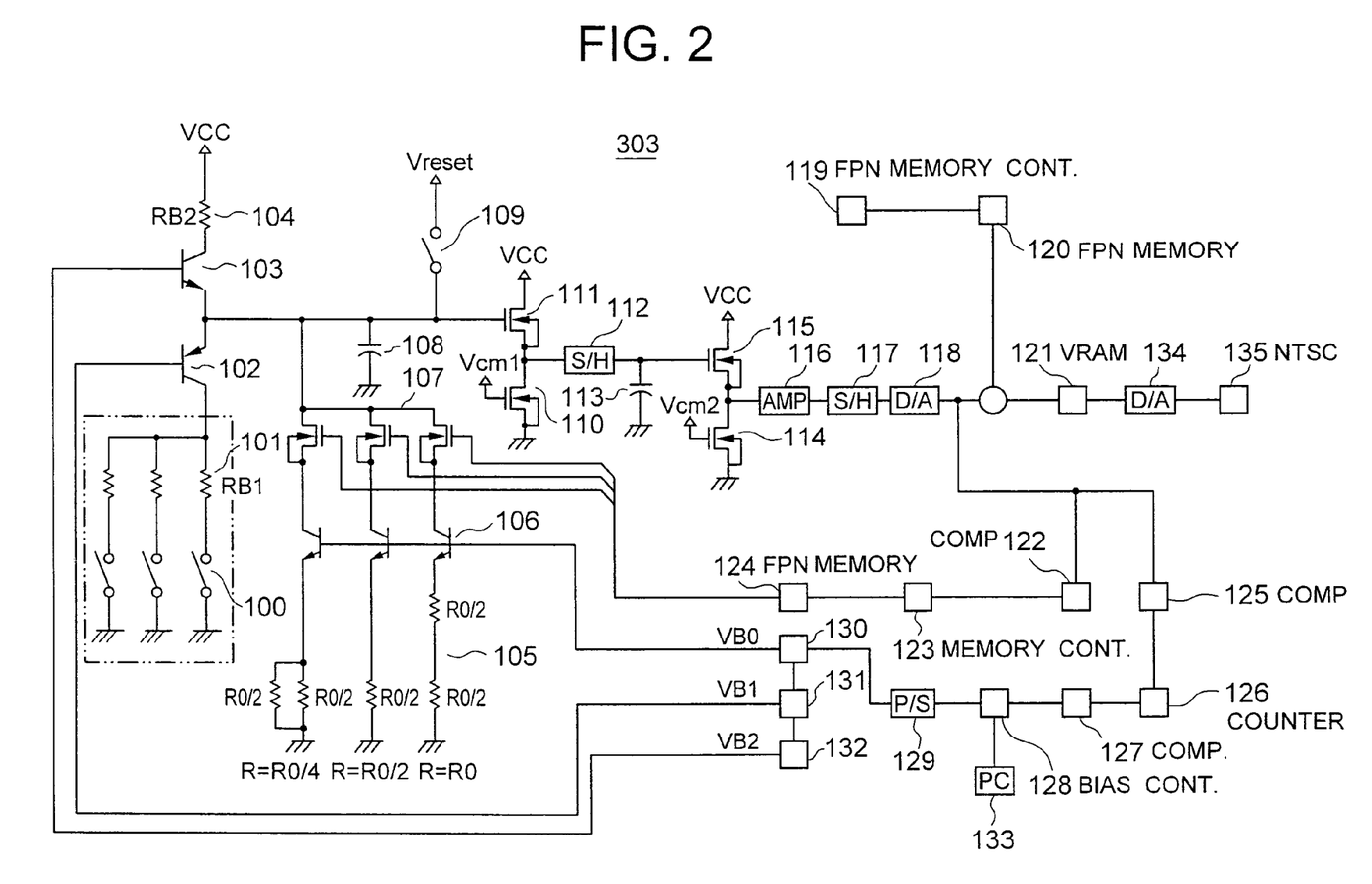
FIG. 2 is a circuit diagram of a read circuit of a semiconductor imaging device according to an embodiment of the present invention.

Referring to FIG. 2, an imaging device according to a first embodiment of the present invention includes a semiconductor substrate, an array of thermocouples 101, an array of select switches 100, and a read circuit for the thermocouples 101. The read circuit includes an emitter follower including NPN transistor 102, PNP transistor 103 and a resistor 104, FPN correction circuit including a plurality of resistors 105, NPN transistors 106, and FPN correction switches 107, a FPN memory 124, bias circuits 130, 131, and 132, an integration capacitor 108, a reset switch 109 etc., which are formed on the semiconductor substrate.

The thermocouples 101 are arranged in one-or two-dimensional array, and each implemented by a bolometer formed on a diaphragm for sensing incident infrared ray. The array of switches 100 consecutively selects one of the thermocouples 101. The resistors 105 have resistances corresponding to power of 2, i.e., R0/4, R0/2 and R0.

When a bias voltage VB1 is applied to the base of transistor 102, a voltage (VB1−VBE) appears across the thermocouple 101 selected by one of the switches 100, given VBE being the base-emitter voltage of transistor 102. Thus, a collector current IC1=(VB1−VBE)/RB1 flows toward transistor 102, given RB1 being the resistance of the selected thermocouple 101.

Figure 3:
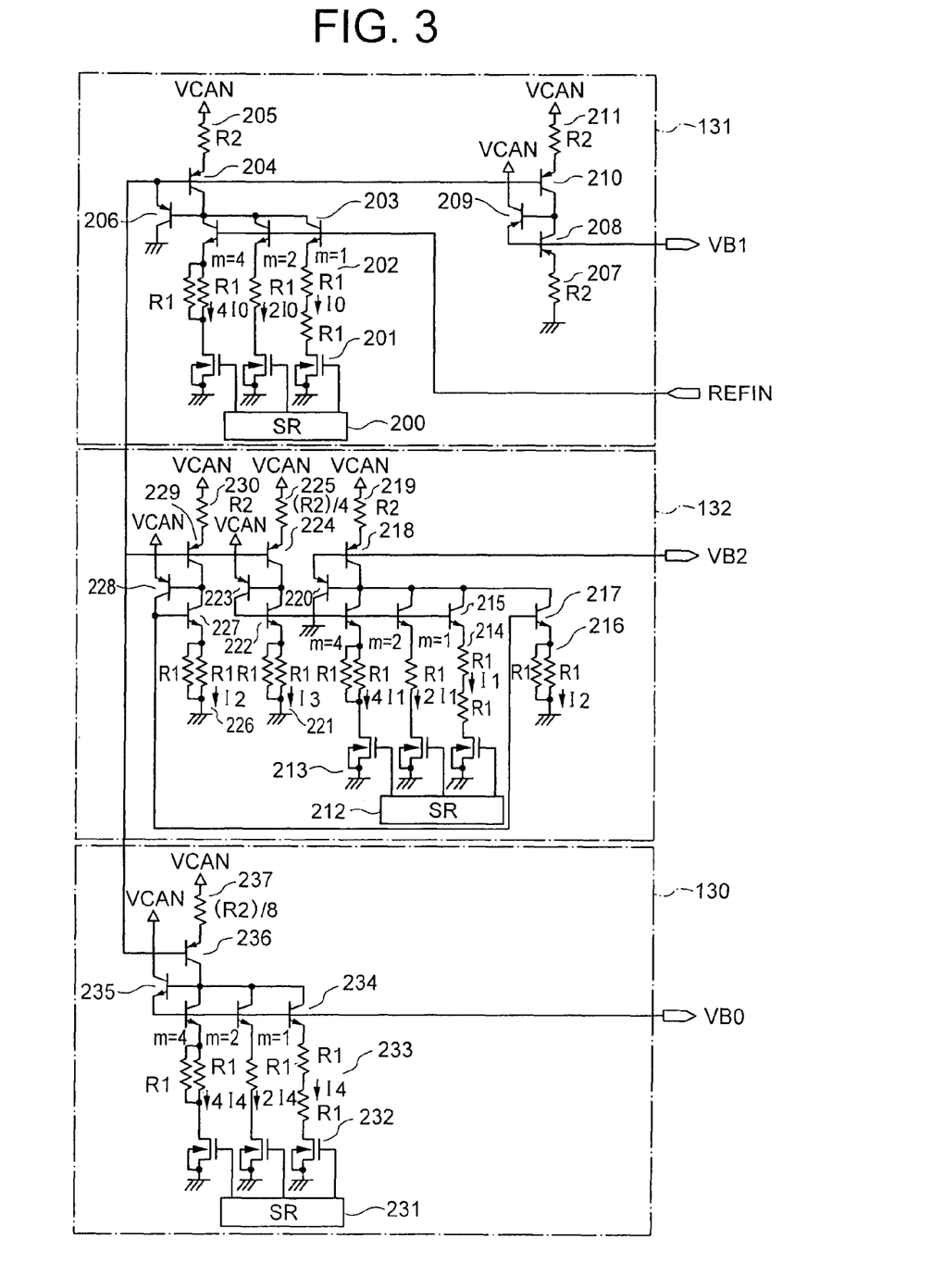
FIG. 3 is a circuit diagram of the bias circuits shown in FIG. 2.

The base of transistor 102 is connected to the output line of a VB1 bias circuit 131, which is implemented by a variable voltage source. FIG. 3 shows exemplified configurations of the bias circuits including VE1, VB2 and VB0 bias circuits 131, 132 and 130.

The VB1 bias circuit 131 includes a shift register 200, a plurality of MOS switches 201 each having a gate connected to one of the outputs of the shift register 200 and a source grounded, a plurality of resistors 202 each having a terminal connected to the drain of one of the MOS switches 201, a plurality of NPN transistors 203 each having an emitter connected to the other terminal of a corresponding one of the resistors 202, a PNP transistor 206 having a base connected to the common collectors of NPN transistors 203 and a collector grounded, a PNP transistor 204 having a collector connected to the common collectors of NPN transistors 203, a resistor 205 connected between a power source line VCAN and the emitter of PNP transistor 204, a PNP transistor 210 having a base connected to the base of transistor 204 and the emitter of transistor 206, a resistor 211 connected between the emitter of transistor 210 and the power source line VCAN, an NPN transistor 209 having a base connected to the collector of transistor 210 and a collector connected to the power source line VCAN, an NPN transistor 208 having a collector connected to the collector of transistor 210 and a base connected to the emitter of transistor 209 and a resistor 207 connected between the emitter of transistor 208 and the ground.

The resistors 202 have resistances corresponding to the power of 2, i.e., R1/2, R1 and 2R1 where R1 is a resistance of the unit resistor. The emitter sizes of NPN transistors 203 also correspond to the power of 2, i.e., m, 2m and 4m, where m is the unit emitter size, corresponding to the resistances 2R1, R1 and R1/2 of resisters 202. A reference voltage REFIN is applied to the bases of transistors 203, and the output line VB1 of the VB1 bias circuit is taken out from the emitter of transistor 209.

In the above configuration, the VB1 bias circuit 131 includes a plurality of current sources having current ratios I0, 2I0 and 4I0 among them corresponding to the power of 2. Thus, the VB1 bias circuit 131 supplies variable constant currents selected at $2^3$ steps from zero to 7I0, by setting the codes in the shift resistor 200. The resistances of the resistors 202 are implemented by combinations of unit resistance R1, for alleviating the variations among the resistors. Thus, the VB1 bias circuit supplies variable bias current to the base of transistor 102.

The emitter sizes (M) of transistors 203 are selected corresponding to the power of 2 so that the current flowing through transistors 203 exactly correspond to the power of 2. More specifically, the base current IB and the base-emitter voltage VBE satisfy therebetween the following relationship:

$$IB=M \times IB0 \times \mathrm{Exp}[qBE/kT]$$

wherein IB0, q, k and T are the reverse leakage current, the charge of the electron, Boltzman constant and absolute temperature, respectively. The base current IB is expressed in terms of the collector current IC by IB=IC/β where β is a current amplification factor of transistors 203. Here, for obtaining an equal base-emitter voltage VBE for the transistors 203, it is necessary to change the emitter size M corresponding to the collector current IC or base current IB of transistors 203. In other words, since the common voltage REFIN is applied to the bases of transistors 203, the collector current does not follow the ratio of resistances if the base-emitter voltage of transistors are different from one another. That is, by changing the emitter size corresponding to the collector current defined by the resistance, an exact collector current can be obtained.

The configuration wherein the resistor 202 is directly connected to the emitter of transistor 203 reduces the shot noise of the NPN transistor 203, Johnson noise of resistor and the noise of the output line of the current source connected to the base of transistor 203.

Back to FIG. 2, by applying a bias voltage VB2 to the base of transistor 103 allows a collector current IC2=(VB2−VBE)/RB2 to flow toward transistor 103, wherein RB2 is the resistance of resistor 104. The currents IC1 and IC2 are substantially balanced with each other, and a small difference current ΔI=IC2−IC1 flows toward the integration capacitor 108. The difference current ΔI includes a signal component detected by the thermocouple and a noise bias component which cannot be not removed from the bias component. That is, a larger portion of the bias component is removed from the current flowing to the integration capacitor 108.

The base of PNP transistor 103 is connected to the VB2 bias circuit 132, the configuration of which is also shown in FIG. 3.

The VB2 bias circuit 132 includes a shift register 212, a plurality of MOS switches 213 each having a gate connected to one of the outputs of the shift register 212 and a source grounded, a plurality of resistors 214 each having a terminal connected to the drain of a corresponding one of the MOS switches 213, a plurality of NPN transistors 215 each having an emitter connected to the other terminal of a corresponding one of resistors 214, a PNP transistor 220 having a base connected to common collectors of transistors 215 and a collector grounded, a PNP transistor 218 having a collector connected to the common collectors of transistors 215, a resistor 219 connected between the power source line VCN and the emitter of transistor 218, an NPN transistor 222 having a base connected to common bases of transistors 215 and an emitter connected to the ground via a resistor 221, a PNP transistor 224 having a collector connected to the collector of transistor 222 and an emitter connected to the power source line VCAN via a resistor 225, an NPN transistor 227 having an emitter connected to the ground via a resistor 226, a PNP transistor 229 having a collector connected to the collector of transistor 227 and an emitter connected to the power source line via a resistor 230, a PNP transistor 228 having a collector connected to the base of transistor 227, a base connected to the collectors of transistors 227 and 229 and an emitter connected to the power source line, an NPN transistor 217 having a base connected to the base of transistor 227, an emitter connected to the ground via a resistor 216 and a collector connected to the common collectors of transistors 215.

Resistors 214 have resistances corresponding to the power of 2, i.e., R1/2, R1 and 2R1, each of resistors 221, 226 and 216 has a resistance of R1/2. The emitter sizes of transistors 215 have ratios among them corresponding to the power of 2, i.e., m, 2m, 4m...., corresponding to the collector current defined by the resistances of the respective associated resistors 214. The base of transistor 224 is connected to the bases of transistors 204 and 210. The output line VB2 of the VB2 bias circuit 132 is taken out from the emitter of transistor 220.

In the above configuration, the VB2 bias circuit 132 includes a plurality of current sources having currents I1, 2I1, 4I1, ... corresponding to the power of 2, similarly to the VB1 bias circuit 131.

The current I2 flowing through transistor (current source) 217 is equal to the current I2 flowing through transistor (current source) 208 of the VB1 bias circuit 131. The current I3 flowing through transistor (current source) 222 is equal to ¼ of the current I2 flowing through transistor 208 of the VB1 bias circuit 131.

Back to FIG. 2, the bases of transistors 106 are connected to the output line of the VB0 bias circuit 130, the configuration of which is also shown in FIG. 3.

The VB0 bias circuit 130 includes a shift register 231, a plurality of MOS switches 232 each having a gate connected to one of the outputs of the shift register 231 and a source grounded, a plurality of resistors 233 each having a terminal connected to the drain of one of the MOS switches 232, a plurality of NPN transistors 234 each having an emitter connected to the other terminal of a corresponding one of resistors 233, a PNP transistor 235 having a base connected to common collectors of NPN transistors 234 and a collector connected to the bases of transistors 234 and the output line VB0 of the VB0 bias circuit 130, a PNP transistor 236 having a collector connected to the common collectors of transistors 234, a resistor 237 connected between the power source line VCAN and the emitter of PNP transistor 236. The resistors 233 have resistances corresponding to the power of 2, i.e., R1/2, R1 and 2R1. The emitter sizes of NPN transistors 234 also correspond to the power of 2, i.e., m, 2m and 4m.

In the above configuration, the VB0 bias circuit 130 includes a plurality of current sources having current ratios, I4, 2I4 and 4I4 among them corresponding to the power of 2. Thus, the VB1 bias circuit 131 supplies variable constant currents, by setting the codes in the shift resistor 231.

For reducing the temperature drift of the imaging device, it is preferable to reduce the temperature dependency of the variable constant currents I0, 2I0, 4I0, ... from the VB1 bias circuit 131, variable constant currents I1, 2I1, 4I1, ... from the VB2 bias circuit 132, and variable constant currents I4, 2I4, 4I4, ... from the VB0 bias circuit 130. The currents I1, 2I1, 4I1, ... and I2, 2I2, 4I2, ... are determined based on I0, 2I0, 4I0, ... Thus, the reference voltage REFIN should have a smaller temperature dependency, and is preferably implemented as a bandgap reference voltage source.

Figure 4:
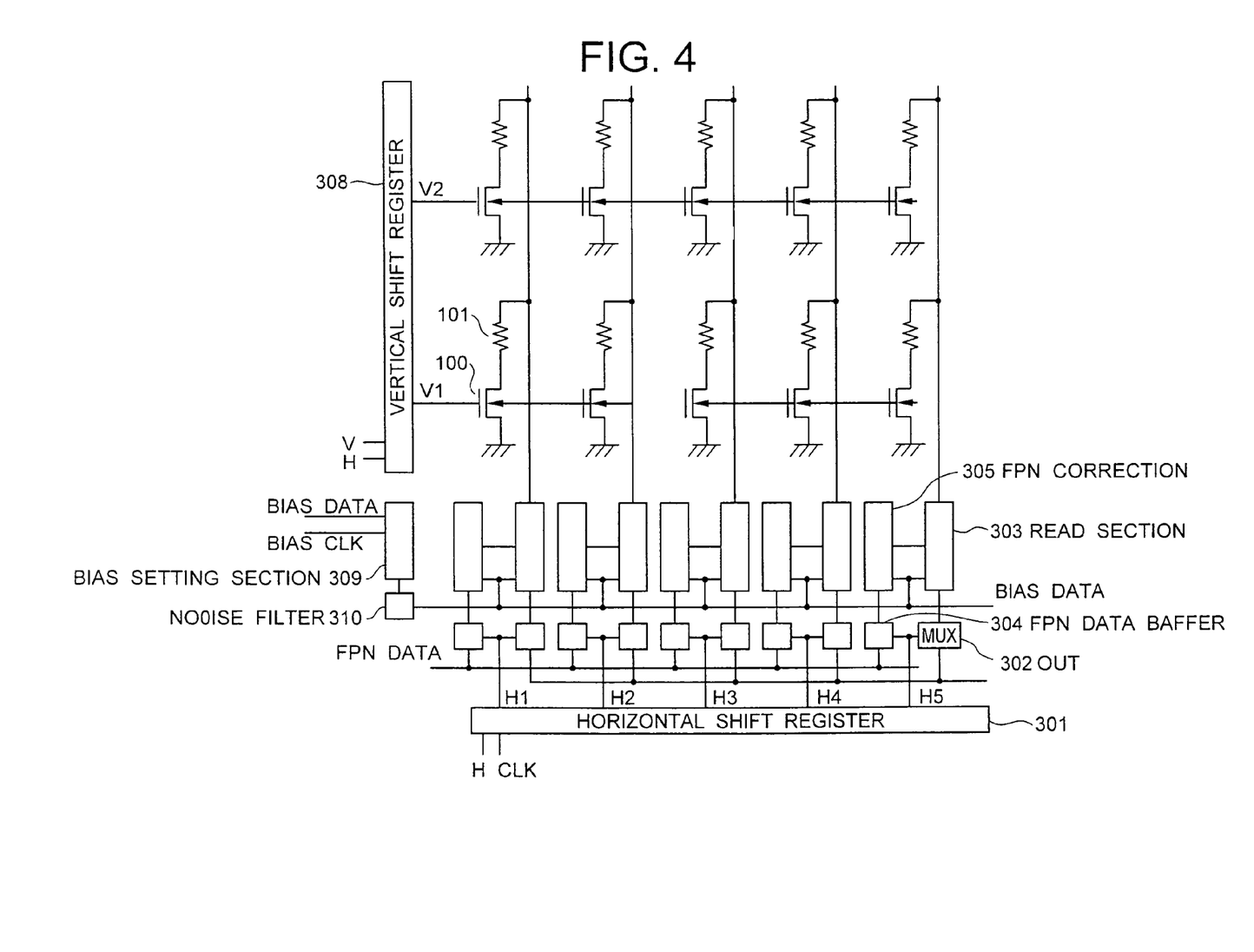
FIG. 4 is a block diagram of the imaging device having, the read circuit as shown in FIG. 2.

Referring to FIG. 4, in the imaging device according to the present embodiment, a plurality combinations of thermocouple 101 and MOS switch 100 are arranged in a matrix. For each column of the thermocouples 101, a horizontal shift register 301, a read circuit 303, a FPN data buffer 304 and a FPN correction current source 305 are disposed for reading the signal from the column of the thermocouples 101. A multiplexer 30 is provided for selection of one of the columns of the thermocouples. The imaging device further includes a vertical shift register 308, a bias circuit 309 and a noise filter 310.

The thermocouples 101 arranged in a two-dimensional array are consecutively selected by the MOS switches 100. The read circuits 303 each disposed for a column of the thermocouples have an advantage of a longer read time for each frame period due to the concurrent operation of all the read circuits 303. The longer read time affords reduction of the noise band accordingly. However, there is a trade-off between the number of read circuits and the chip area or dimensions that the large number of read circuits corresponding to the number of columns increases the area or dimensions of the chip.

In an alternative, a read circuit may be provided for all the columns of the thermocouples 101, which affords reduction of the area and the dimensions of the chip. However, the read operation conducted in a time-division scheme for each column reduces the read time and involves a larger noise band.

The FPN correction data fed to the FPN correction current source 305 for all the pixels are stored in a memory disposed outside the chip of the imaging device. In this case, when each read circuit 303 operates for a read processing including integration, the FPN buffer 304 stores the FPN data for the pixel for which the read circuit is operated for the read processing.

The bias setting data supplied to the bias setting circuit 309 is fed as serial data from the memory disposed outside the chip, and stored in a shift register disposed in the bias setting circuit 309. The noise filter 310 is implemented as a CR filter disposed outside the chip, for example.

The output of the read circuit 303 for each column is connected to the input of the sample/hold circuit disposed in the read circuit 303. The outputs from the sample/hold circuits are consecutively selected by the multiplexer 302 one by one. The horizontal shift register 301 consecutively selects the switches in the multiplexer 302 and the FPN data buffers 304 for the columns. The FPN data buffers 304 receives the FPN data through the FPN data bus FPN DATA having data lines in number (three, for example) corresponding to the number of bits of the FPN correction current source 305, which is equal to the number of transistors which need setting.

Figure 5:
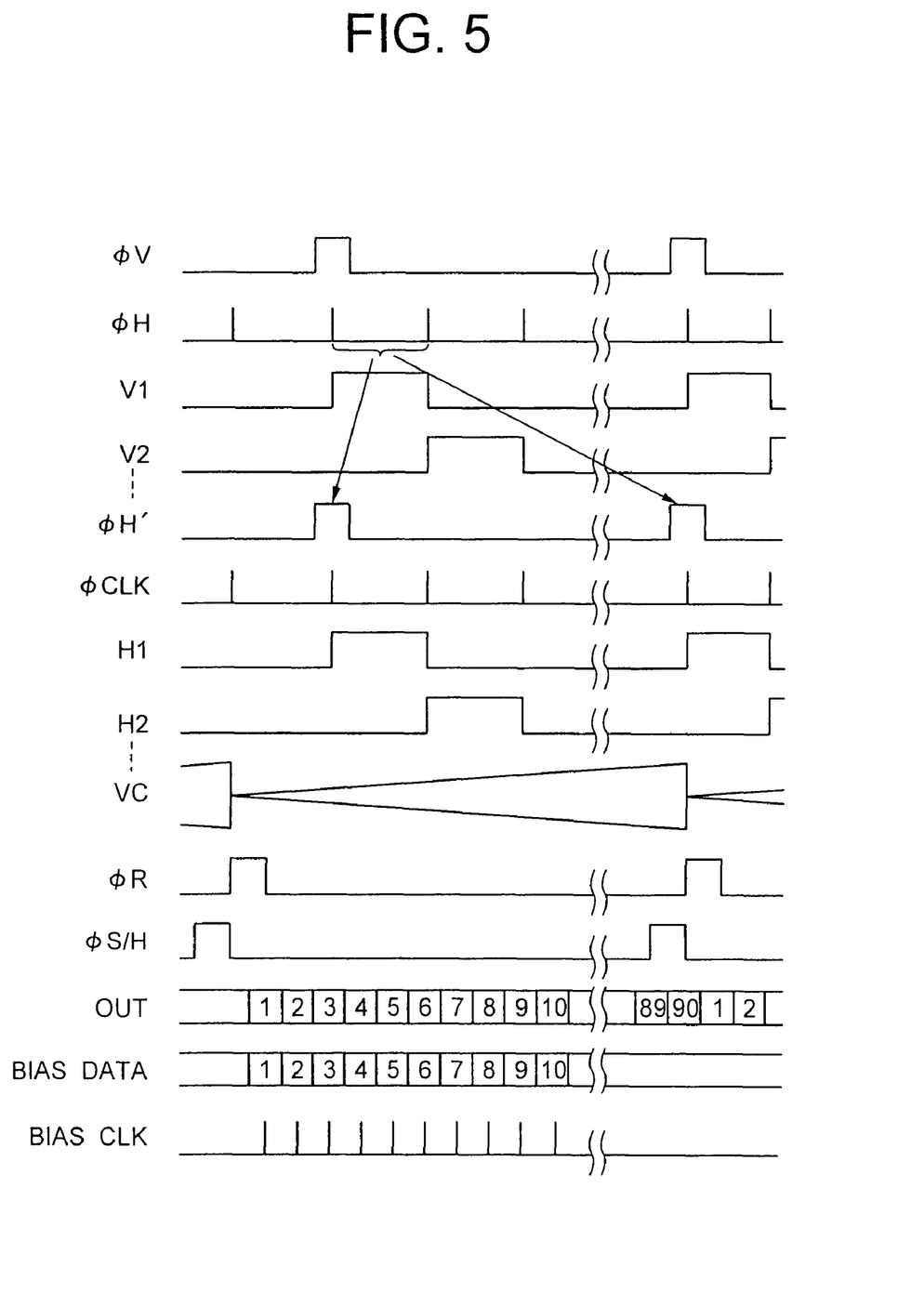
FIG. 5 is a signal timing chart showing operation in the imaging device of FIG. 4.

Referring to FIG. 5, there is shown a timing chart in the imaging device, wherein $\phi V$ is a vertical synchronizing signal having a frequency of around 30 Hz, and $\phi H$ is a horizontal synchronizing signal having a frequency of around 7 kHz. The signals $\phi V$ and $\phi H$ are fed to the data terminal V and the clock terminal H, respectively, of the vertical shift register 308. Thus, the vertical shift register 308 consecutively delivers row selecting signals V1, V2, ...

While a row is selected, each read circuit 303 operates for reading the integrated data VC integrated by the integration capacitor 108. The sample/hold circuit 112 responds to the sample/hold signal $\phi S/H$ to sample and hold the integrated data VC, which is then stored in the holding capacitor 113. The reset pulse $\phi R$ fed from the reset switch 109 resets the integration capacitor 108.

The horizontal shift register 301 receives signals $\phi H'$ and $\phi V$ at the data terminal H and the clock terminal CLK, respectively, to consecutively generate column selecting signals H1, H2, ... The column selecting signals consecutively selects the switches of the multiplexers 302 and the FPN data buffers 304.

The signal $\phi H$ may be used instead of the signal $\phi H'$. The signal stored on the holding capacitor 113 for each column is fed through the multiplexer 302 to the output terminal OUT.

The FPN data is transferred to the FPN data buffer 304 before the read circuit 303 reads the signal from the thermocouple of the row. The FPN data buffers receive column selecting signals H1, H2, ...

The bias setting current (BIAS DATA) is transferred to the bias setting circuit 309 before or during the read operation by the read circuit 303. The voltage generated by the bias setting circuit 309 sets the base voltages of transistors 102 and 103 in the read circuit 303 and the base voltage of transistor 106 in the FPN correction current source 305.

Figure 6:
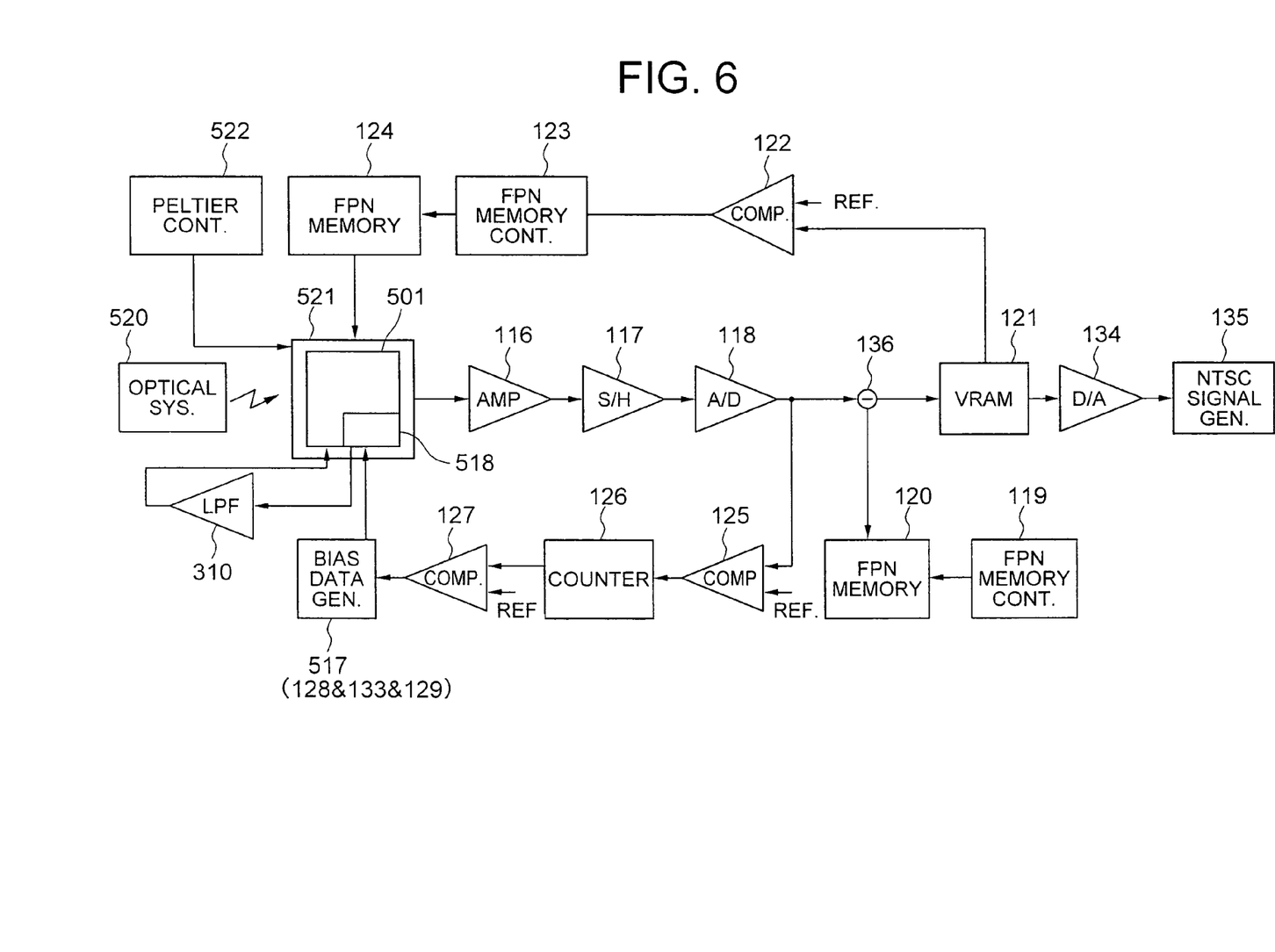
FIG. 6 is a block diagram of the overall configuration of the imaging device of FIG. 4.

Referring to FIG. 6, there is shown overall configuration of the imaging device of the present embodiment in a block diagram. The imaging device includes an imaging array 501, and a read circuit including an amplifier 116, a sample/hold circuit 117, an A/D converter 118, video RAM (VRAM) 121, a FPN memory controller 119, a FPN memory 120, a digital subtracter 136, a D/A converter 134, a NTSC signal generator 135, a comparator 122, a counter 126, a comparator 127, a bias data generator 517 etc.

The imaging section 501 includes the circuit configuration such as shown in FIG. 4 and mounted on a single chip. The incident light is focused by an optical system 520 on the imaging section 501, which converts the incident light to electric signals. The electric signals are integrated by the integration circuit in the imaging section 501 and output to outside the imaging section 501. The amplifier 116 amplifies output signals from the imaging section 501 to feed the same to the sample/hold circuit 117. The A/D converter 118 converts the analog signal held by the sample/hold circuit 117 into digital signals as pixel data. The amplifier 116 may be omitted if the imaging section 501 outputs image signals having sufficient amplitudes.

VRAM 121 stores the pixel data, and has a capacity of 320×240×12 bits for the imaging section 501 having 320×240 thermocouples with a single pixel delivering a 12-bit signal.

The FPN memory 120 is used for correcting or compensating the variations which are not removed by the FPN correction circuit in the imaging section 501, and stores data used for correcting variations in the pixels. The digital subtracter 136 reduces the values corresponding to the variations from the pixel data which are fed in real time.

The pixel data output from the imaging section 501 when the incident light is intercepted by a shutter have variations that are not removed by the FPN correction circuit in the imaging section 501. The pixel data obtained by using the shutter are stored in the FPN memory 120 as pixel correction data. This operation is conducted each time a power source is supplied to the imaging device or after a previous correction is invalidated. In a normal operation of the imaging section 501, the pixel correction data stored in the FPN memory 120 are fed to the subtracter 138, which subtracts the pixel correction data from the pixel data which are fed in real time from the imaging section 501 to obtain corrected pixel data which reside within the dynamic range.

The subtracter 136 may be replaced by an adder which receives complements of the pixel correction data supplied from the FPN memory 120. In addition, the subtracter may be disposed between the VRAM 121 and the D/A converter 134.

The D/A converter 134 converts the corrected pixel data into analog signals, which are supplied to the NTSC signal generator 135. The NTSC signal generator 135 synthesizes the analog signals and the synchronizing signals to generate NTSC composite signals. The NTSC signal generator 135 may be replaced by a PAL or RGB signal generator.

Back to FIG. 2, the FPN correction circuit 10 in the imaging section 501 also uses FPN correction data, which are obtained beforehand and fed from the FPN memory 124. The comparator 122 judges whether or not the pixel data is higher than the reference level. The reference level may be determined by the lower limit or the higher limit of the dynamic range of the amplifier, A/D converter or other signal processing circuit, may be determined by the lower limit or the higher limit with a specified margin. The comparator 122 may determine whether or not the pixel data is higher than the reference level, is lower than the reference level, or resides within a specified range.

The FPN memory controller 123 generates FPN correction data based on the results of comparison by the comparator 122. The FPN correction data are stored in the FPN memory 124. The FPN memory 124 has a storage capacity which is the product of the number of the pixels and the number of the bits of the FPN correction data. For example, in the case of 320×240 pixels and the FPN correction data being a 3-bit data, the FPN memory has a storage capacity of 320×240×3. For controlling the FPN correction data in a byte by byte basis, the FPN memory may have a larger storage capacity.

The bias setting data to be fed to transistors 102, 103 and 106 in FIG. 2 are obtained as detailed below. The comparator 125 judges whether or not the levels of the pixel data are higher than a threshold level set within the dynamic range. The threshold level may be determined as the lower limit or the higher limit of the dynamic range of the integration circuit 108, amplifier 1165, A/D converter 118 or other signal processing circuit, or may be determined as the lower limit or the higher limit with a specified margin. The comparator 125 may determine whether or not the pixel data is higher than the threshold level, is lower than the threshold level, or resides within a specified range determined by two threshold levels.

The counter 126 counts by responding to the results of the comparison by the comparator 125 which are either "1" or "0". In this case, the counter 126 may count desired results (pass), undesired results (fail) or both the desired and undesired results.

The comparator 127 compares the count by the counter 126 with a reference level or number setting. The number setting may be the number of pixel data which are higher than the threshold level set within the dynamic range, or pixel data which are lower than the threshold level set within the dynamic range.

In FIG. 6, the bias data generation circuit 517 generates the bias setting data based on the results of the comparison by the comparator 127. The bias setting data thus generated are fed to the bias circuit 518 in the imaging section 501. The bias circuit 518 generates a bias voltage based on the digital bias data generated by the bias data generation circuit 517, using the constant current source.

The noise filter 310 is a low-pass-filter in this example, and suppresses the noise from the bias voltage supplied from the bias circuit.

Peltier element 521 is used for stabilizing the temperature of the imaging section 501, and controlled by a Peltier control circuit 522.

Figure 7:
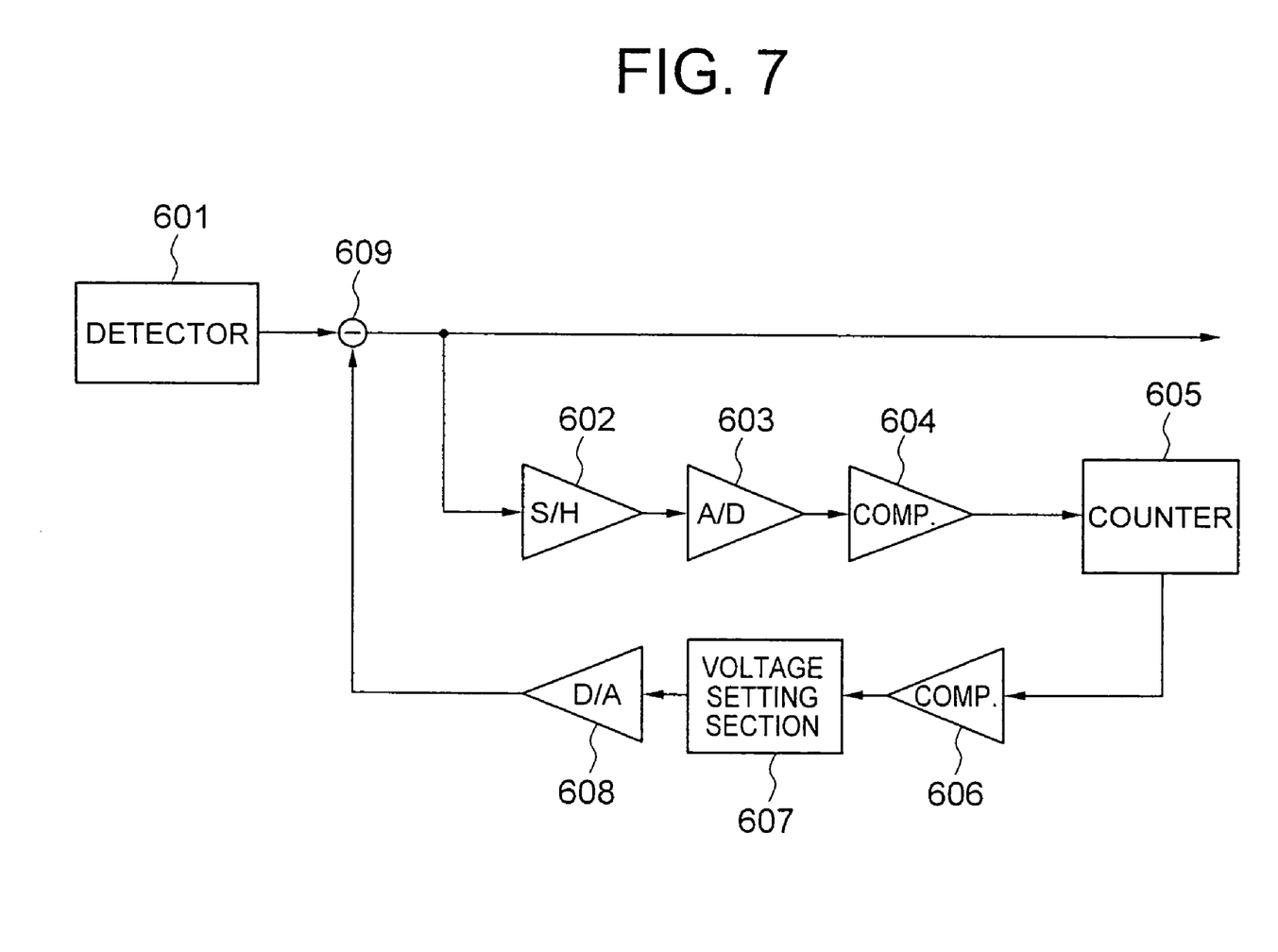
FIG. 7 is a block diagram of a semiconductor sensor device according to an embodiment of the present invention.

Referring to FIG. 7, a semiconductor sensor device according to a second embodiment of the present invention is described here as a broader concept of the sensor device including the imaging device of FIG. 6. The sensor device includes a detecting section 601, a sample/hold circuit 602, an A/D converter 603, a comparator 604, a counter 605, a voltage setting circuit 607, a D/A converter 608 and a subtracter 609.

The detecting section 601 is such that control of the bias current therefor changes the output signal level thereof as in the case of the imaging device of FIG. 6. In this example, the output signal is an analog signal. The sample/hold circuit 602 samples and holds the output of the detecting section 601 supplied through the subtracter 609. The A/D converter 603 converts the output signals of the sample/hold circuit 602 into digital signals.

The comparator 604 compares the output of the A/D converter 603 with a threshold level, as in the case of comparators 125 and 127.

The counter 605 counts the number of the results of comparison which include high (or low) levels of the comparator 604. The comparator 606 compares the count of the counter 605 with a specified number or number setting. The output of the comparator 606 indicates that the specified number of pixel data exceeded the specified number setting, fore example.

The voltage setting circuit 607 generates a voltage setting data based on the result of the comparison by the comparator 606, and delivers the voltage setting data to the D/A converter 608.

The D/A converter 608 converts this digital signal into analog signal. The subtracter 609 subtracts the digital voltage setting data from the real time pixel data, to obtain; modified pixel data which resides within the dynamic level.

Figure 8:
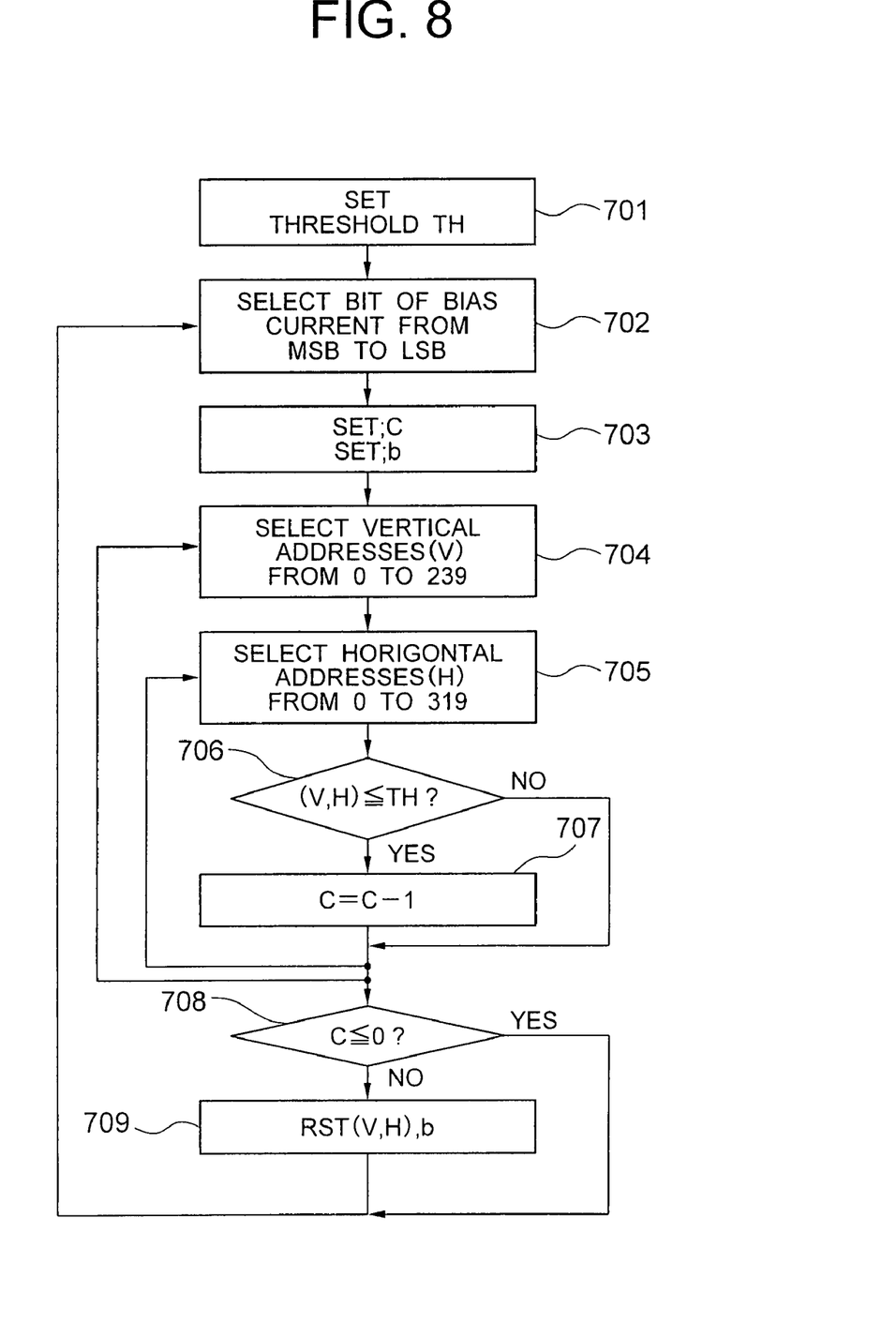
FIG. 8 is a flowchart of the detecting device of FIG. 7 during adjusting the bias current therein.

Referring to FIG. 8, there is shown operation of the read circuit. In this example, the bias current is expressed by a 3-bit data. Most of the process steps shown therein are iterated for the three bits of the bias current. First, in step 701, a threshold level TH is determined in the detecting device before starting the operation. The threshold may be determined as a lower limit or a higher limit of the dynamic range, which may be added with a margin. In step 702, one of the three bits, MSB, for the bias current is selected as a subject bit "b", followed by setting a specified count "C" for the counter and setting "1" for the subject bit "b" in step 703.

In step 704, the vertical address is selected by incrementing the previous vertical address from zero to 239, during the loop of steps 704 and 707. In step 705, the horizontal address is selected by incrementing the previous horizontal address from zero to 319 during the loop of steps 705 to 707. In step 706, each pixel data (V,H) is compared with the threshold TH. If the current pixel data (V,H) is equal to or below TH, then the counter counts down by one in step 707. Then, the process returns to step 705 (or 704) for iteration of the loop, wherein similar comparison and count down for another pixel data are conducted. If the current pixel data (V,H) is higher than TH, then step 706 is bypassed to effect the loop of steps 705 to 707 (or 705 to 707).

In step 708, if the resultant count C is equal to or below zero after all of the pixel data are compared with the threshold level, the process returns to step 702, wherein another lower bit of the bias current is selected as the subject bit and examined similarly. If the count is higher than zero after all of the pixel data are compared with the threshold level, the serial number of pixel data and the selected bit are reset to "0", followed by returning to step 702. Thus, all the three bits of the bias current are set at suitable values, for achieving that the number of pixel data below the threshold is equal to or lower than the number setting due to the suitable bias current.

Referring to FIGS. 9A to 9D, there are shown algorithms of the operation of FIG. 8, showing different embodiments of the present invention. Operation of the read circuit will be more detailed with reference to FIGS. 8 and 9A to 9D. In FIGS. 9A to 9D, the curves designated by (I) are such that the number of pixel data which are below the threshold level is plotted on ordinate against the bias current plotted on abscissa. The curve designated by (II) is such that the number of pixel data which is above the threshold level is plotted against the bias current.

Figure 9A:
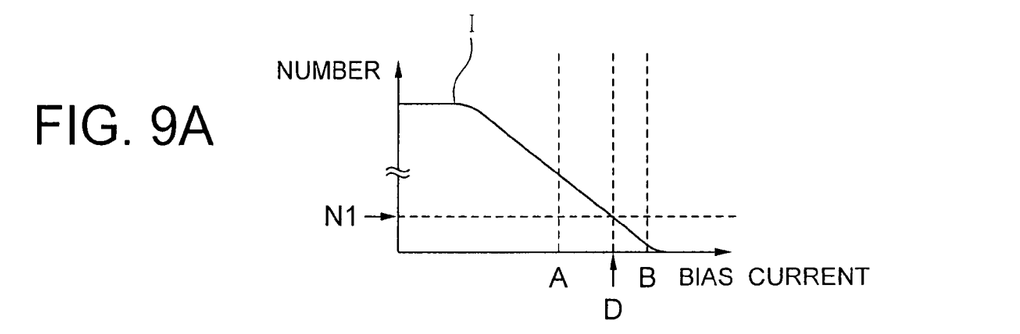
FIGS. 9A to 9D are schematic graphs showing different embodiments of the present invention during adjustment of the bias current and/or the full-scale of the FPN correction current.

In FIG. 9A, it is shown that the desired bias current "D" is determined by the specified number setting (N1) for the counter. If the bias current is set below "D", the number of pixel data below the threshold is higher than the number setting N1. On the other hand, if the bias current is set at above "D", the number of pixel data below threshold is below the number setting N1.

After the threshold TH is set in step 701, the bias current set in steps 702 and 703 has "1" for MSB3 and "0" for the other bits, i.e., "100". This bias current corresponds to "A" in FIG. 9A, which is roughly ½ of the maximum bias current. After the number of pixel data which are below threshold TH1 is counted in steps 704 to 707, the resultant number is examined in step 708. In this case, since the resultant number is higher than the number setting N1 (C<0 in step 708), the bias current "A" is considered below the desired bias current "D". Thus, "1" for MSB is left as it is, and the process returns to step 702.

In step 702, another bit next to MSB is selected as the subject bit, which is set at "1", i.e., the setting for the bias current is "110", which is ¾ of the maximum bias current and corresponds to "B" in FIG. 9A. After the number of pixel data which are below the threshold is counted and examined in steps 704 to 708, it is detected that the number of pixel data thus obtained is below the number setting, N1 in step 708. Thus, the process advances to step 709 wherein the subject bit is reset, followed by returning to step 702.

The process steps are iterated until the LSB of the bias current is determined, whereby the desired bias current "D" can be obtained, under which the number of pixel data which is below the threshold is substantially equal to the number setting N1.

In the embodiment shown in FIG. 9B, both the number of pixel data which are below the threshold level TH and the number of pixel data which are above the threshold level TH are counted. In this case, a first desired bias current D1 is first determined by the process of FIG. 7, and then a second desired bias current D2 is obtained similarly by the process of FIG. 7.

Figure 10A:
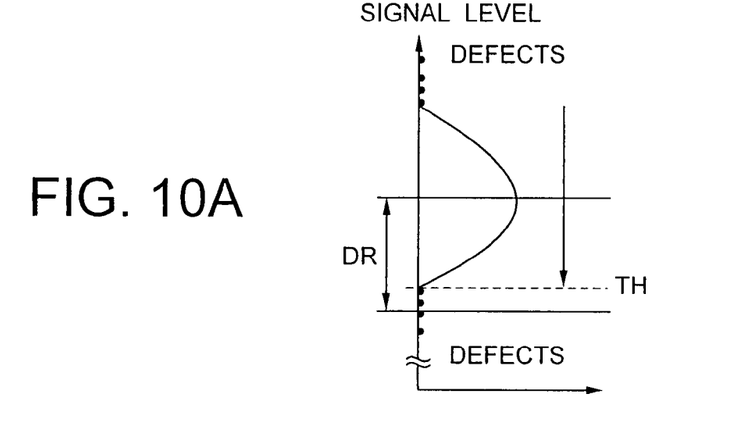
FIGS. 10A to 10C each is a schematic graph showing an algorithm during adjusting the bias current and/or the full-scale of the FPN correction current.
Figure 10B:
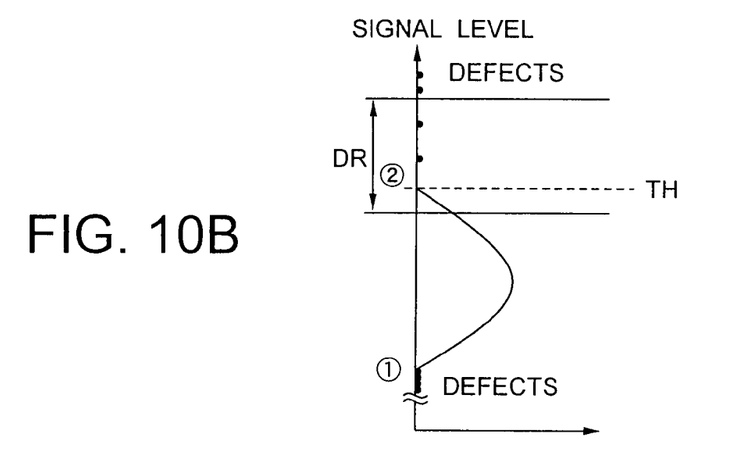

FIG. 10A shows the number distribution of the pixel data for each level of the pixel data when the bias current is set at D1, and FIG. 10B shows the number distribution of the pixel data when the bias current is set at D2.

Figure 9B:
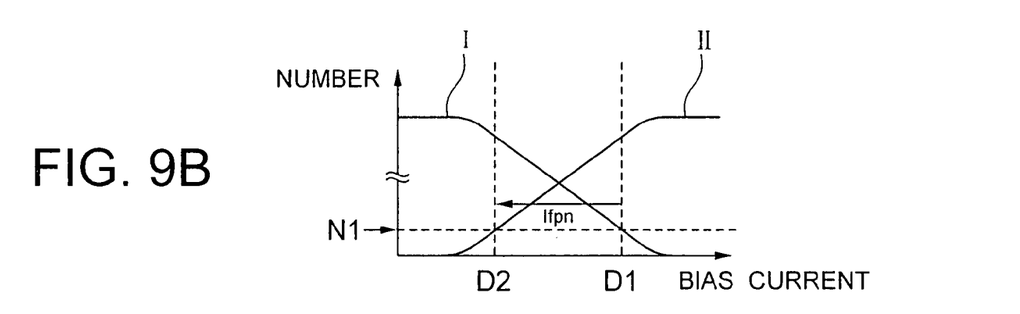

In FIG. 10A, when the bias current is set at D1, the pixel data lower than the threshold TH are defective pixel data, the number of which is roughly equal to N1 shown in FIG. 9B. The obtained bias current D1 is to be determined as the maximum FPN correction current.

In FIG. 10B, when the bias current is set at D2, the pixel data higher than the threshold TH are defective pixel data, which are roughly equal to the number setting N1. The obtained bias current D2 is to be determined as the minimum FPN correction current.

Thus, the full-scale FPN correction current is determined as D2−D1. Thereafter, the bias current is actually set at D1 for operation of the imaging device. By adding the FPN correction current having a full scalp D2−D1, the pixel data reside in the vicinity of the threshold TH as shown in FIG. 10B. Thus, the pixel data has a dynamic range DR which has a larger range above the threshold TH compared to the lower range. The remaining difference RE is due to the resolution limited by the number of bits of the FPN correction current. The remaining difference is reduced by increasing the number of bits of the FPN correction current.

In the above configuration, the number N1 may be different between the number settings for the pixel data above the threshold and for the pixel data below the threshold. In addition, the pixel data may have a larger range below the threshold instead of the above configuration.

Figure 9C:
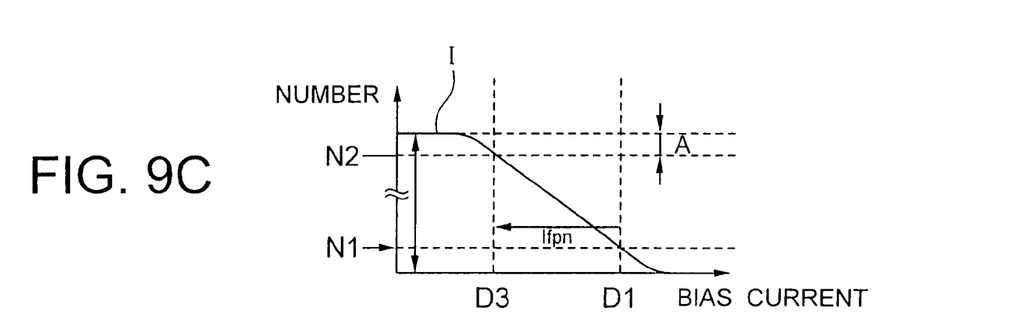

In the embodiment shown in FIG. 9C, two number settings N1 and N2 are determined for the number of pixel data which is below the threshold, instead of counting the number of pixel data which are above the threshold. The number setting N2 is the lower limit of the number of pixel data which are below the threshold. Both the bias currents D1 and D3 are obtained by the process shown in FIG. 8. The FPN current can be obtained by the desired bias currents D1 and D3.

In this case, the threshold, the lower limit number setting N1 and the higher limit number setting N2 are determined beforehand. The number of pixel data which are below the threshold is counted and the desired bias current D1 for the lower limit number setting N1 is then obtained. Subsequently, the number of pixel data which are below the threshold is counted and the desired bias current D2 for the upper limit number setting N2 is obtained.

Figure 10C:
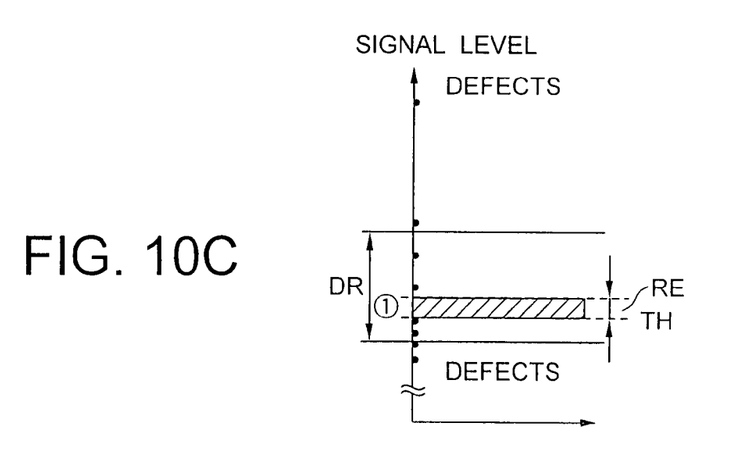

The upper limit number setting N2 may be obtained by subtracting a specified number N3 from the number of all the pixels, wherein the specified number N3 is determined for specifying the number of pixel data which exceeded the threshold level shown in FIG. 10B. Thus, as in the case of FIG. 9B, the pixel data other than the defective pixel data can be corrected to reside in the vicinity of the threshold, as shown in FIG. 10C.

Figure 9D:
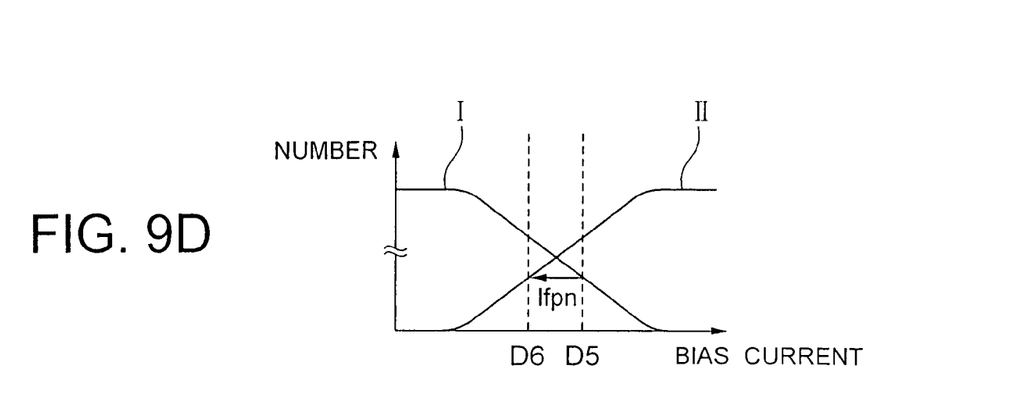

In the embodiment shown in FIG. 9D, the threshold and a full-scale FPN current are first determined instead of specifying the number setting. The desired bias current D3 is obtained by equalizing the number of pixel data which are below the threshold under a specified bias current and the number of the pixel data which are below the threshold under the specified bias current from which the full-scale FPN current is subtracted.

More specifically, after setting the threshold and the full-scale FPN current, MSB for the bias current is set at "1". The number of the pixel data which are below the threshold under a desired bias current is obtained, and then the number of the pixel data which are below the threshold under the desired bias current minus the full-scale FPN current is obtained. By comparing both the numbers and determines the MSB so that the difference between both the numbers assumes a minimum. Other bits are obtained similarly.

The method shown in FIG. 9D is advantageous over the other methods when it is desired to reduce the range of the full-scale FPN current. A larger full-scale FPN current involves a larger remaining difference RE, whereby the ratio of the remaining difference to the dynamic range is larger.

The desired bias current may be determined as detailed below in addition to the method shown in FIG. 7 from the MSB to the LSB. Specifically, the bias current is consecutively changed from the minimum to the maximum in FIG. 2. During this operation, both the number of pixel data which are below the threshold and the number of pixel data which are above the threshold are obtained and then input to a computer 133 shown in FIG. 2, and the algorithm for obtaining the above procedure is executed on the computer 133. This procedure can reduce the circuit scale for the read circuit. In addition, since the data can be observed on a display, the full scale of the FPN correction current can be set with ease.

The bias current and the full scale of the FPN correction current are determined during several frames of the operation of the imaging device. In operation of the imaging device, the vertical synchronizing signal φV has a frequency of around 30 Hz, wherein a frame corresponds to a clock period of the vertical synchronizing signal. In this example, the shift registers in the bias circuits 200, 212 and 231 of FIG. 3 have a 18-bit configuration, The first frame is used for measuring all the pixel data, with the remaining portion of the first frame being blank. The second frame is used for comparing all the pixel data with the threshold level for MSB, counting the number of pixel data which are below the threshold levels and comparing the resultant number with the number setting to obtain the result of the comparison for the MSB. The comparison is iterated for the number of bits for the bias current.

Operation of the integration circuit (capacitor) will be described hereinafter. FIGS. 11A to 11D show the waveforms integrated by the integration capacitor, wherein the voltage across the integrated capacitor is plotted on ordinate against the integration time length plotted on abscissa. The abbreviations Max., Med. and Min. indicate the voltage curves for the pixels having the maximum resistance, medium resistance and minimum resistance.

Figure 11A:
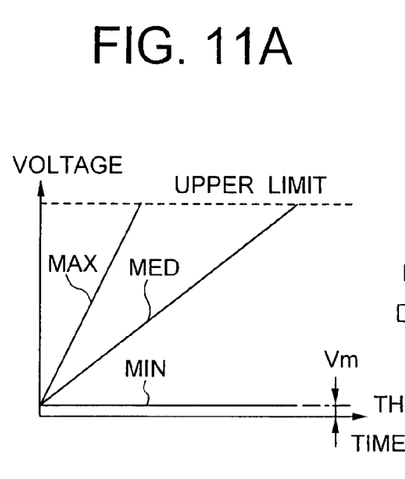
FIGS. 11A to 11D are graphs showing integration by the integration circuit.
Figure 11B:
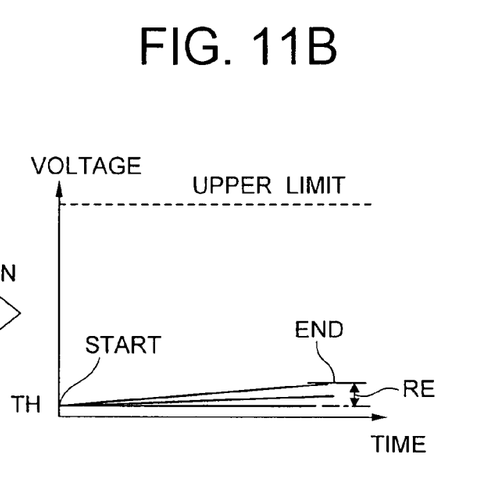
Figure 11C:
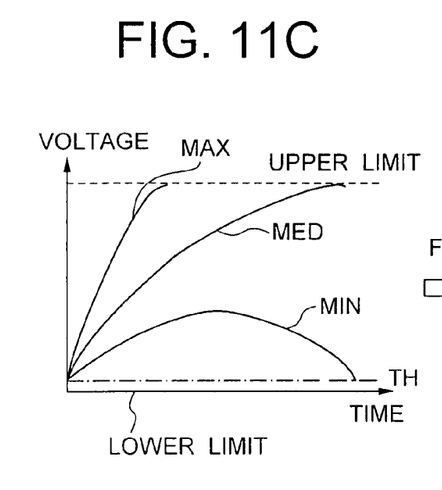
Figure 11D:
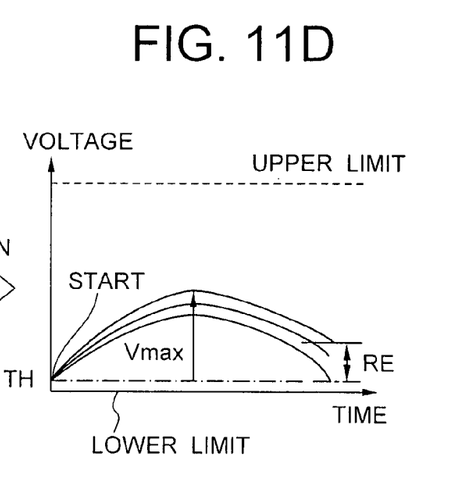

FIG. 11A shows the case of a lower self heating of the bolometer, FIG. 11B shows the result of the correction therefrom by the FPN correction current, FIG. 11C shows the case of a higher self heating of the bolometer, and FIG. 11D shows the result of correction therefrom by the FPN correction current.

In FIG. 11A, the operation for canceling is conducted so that integration of the pixel data corresponding to a minimum bolometer resistance becomes in the vicinity of the lower limit of the dynamic range or the threshold level. Vm is a margin for the change of the bolometer resistance due to the infrared ray. It is generally observed that the integrated data for the pixel having a maximum bolometer resistance exceeds the upper limit of the dynamic range of the detection circuit.

After the FPN correction, the integrated data of the pixels reside in the vicinity of the lower limit of the dynamic range. The degree of the accuracy of the FPN correction in connection with the resolution limited by the bit number affects the results of correction, whereby some error or difference RE remains between the integrated data, as shown in FIG. 11B. It is to be noted that the remaining difference RE in the integrated data results from the quantization error in the FPN correction circuit and not from the magnitude of the bolometer resistance.

In FIG. 11C, the waveforms of the integrated data of the pixels are saturated and reduced with time because the bolometers have negative temperature coefficient of the resistance and the larger self heating. In this case either, an optimum canceling operation is achieved so that the integrated data for the pixel having the minimum resistance is in the vicinity of the threshold level.

By using the FPN correction in the imaging device, the integrated waveforms reside in the vicinity of the lower limit of the dynamic range, as shown in FIG. 11D. As in the case of the pixels having lower self heating, the larger remaining difference RE is not the result from a large bolometer resistance or a lower bolometer resistance. The maximum amplitude Vmax of the integrated pixel data is obtained by adding about half the remaining difference RE to the maximum point of the integrated data having the minimum amplitude. The reason "half the remaining difference" is that the bend (maximal point) of the waveform appears at the time equal to half the end point of the integration. In FIG. 11C, for obtaining the minimum value for Vmax, it is preferable that the level of the start point of the integration, be equal to the level of the end point of the integration for the pixel having a lowest remaining difference, and the remaining difference be at the convex side of the curves, which are convex toward the top in this example.

If the temperature coefficient TCR of the bolometer resistance is positive, these waveforms are convex toward the bottom differently from the curves described above. In this case either, it is sufficient that the level of the start point of the integration be equal to the level of the end point of the integration for the pixel having a lowest remaining difference, and the remaining difference be at the convex sides of the curves, which are convex toward the bottom in this case.

In a practical example for the imaging device having characteristics shown in FIGS. 11C and 11D, the bolometers have resistances between several kilo-ohms to several tens of kilo-ohms in the case of a so-called pulse bias driving technique. The pulse bias driving technique is such that the pixels are applied with the voltage in a time-division scheme. The temperature coefficient of the bolometer resistance is in general several percents per absolute temperature. The applied voltage for the bolometers is preferably 0.5 volt to 5.0 volts in consideration of the magnitude of the signals and the convenience for the signal processing in the IC.

The integration capacitor may preferably have several pico-farads to several hundreds of pico-farads in consideration of the sufficient integration gain, the magnitude of the output signal and suppression of the maximum amplitude Vmax. In this case, the self-heating temperature of the bolometer is several degrees (° C.) to several tens of degrees. While the self heating temperature is preferably lower in view of suppression of the height of the curved integrated data, a suitable level of the self heating is desirable because the noise equivalent temperature difference (NETD) which corresponds to the temperature resolution of the imaging device is generally in proportion to the root square of the joule heat applied to the bolometer or the root square of the temperature by the self heating as recited in "IEEE Technical Report", ED98-265, pp 9-16 by Tanaka et al.

Assuming that the resistance of bolometer is about 10k, Ω, a TCR about −2%/K, the applied voltage about 2 volts, the capacitance of the integration capacitor about 100 pF, the integration time length about 30 μS, the integration gain about 30, and the self heating temperature about 7° C., the maximum amplitude Vmax of the integrated data is about 2 volts. The remaining difference voltage depends on the number of bits of the FPN correction current, and is about 0.2 volts if the number of bits is 6.

The variable current source as provided in the embodiment for supplying the correction current to each of the pixel data enables the output voltages of the pixels having variations to reside within the dynamic range of the detection circuit. This affords feasibility of the signal amplification and signal processing for the pixel data.

The specified scheme wherein the bias current is adjusted by comparing the number of pixel data which are below or above the threshold and the number setting therefor enables the bias current to be set at a high speed with a reduced circuit configuration. In addition, the bias currents and the full-scale FPN correction currents can be obtained at a high speed with a reduced circuit configuration by using the lower limit and higher limit number settings.

Since the above embodiments are described only for examples, the present invention is not limited to the above embodiments and various modifications or alterations can be easily made therefrom by those skilled in the art without departing from the scope of the present invention.

What is claimed is:

1. A semiconductor sensor device comprising:
a plurality of sensor elements;
a signal read circuit for reading levels of output signals from said sensor elements to output pixel data for said sensor elements, said signal read circuit having a bias circuit for supplying a bias signal to said output signals;
a first comparator for comparing said pixel data with a specified threshold level to output result signals having a first level;
a counter for counting the number of said result signals;
a second comparator for comparing said number of said result signals with a specified number; and
a bias controller for controlling said bias signal based on a result of a comparison by said second comparator, so that said number of said result signals becomes substantially equal to said specified number.

2. The semiconductor sensor device as defined in claim 1, wherein said bias controller determines bits of said bias signal from a most significant bit to a least significant bit.

3. The semiconductor sensor device as defined in claim 1, further comprising a fixed pattern noise (FPN) correction circuit for correcting said pixel data by using FPN correction data, wherein said controller calculates first and second desired values for said bias signal based on said number of said result signals having "1" and said number of said result signals having "0", respectively, and said FPN correction circuit determines said FPN correction data based on said first and second desired values.

4. The semiconductor sensor device as defined in claim 1, further comprising a fixed pattern noise (FPN) correction circuit for correcting said pixel data by using FPN correction data, wherein:
said second comparator compares said number of said result signal with a first specified number and a second specified number;
said controller calculates first and second desired values for said bias signal based on said first specified number and said second specified number, respectively; and
said FPN correction circuit determines said FPN correction data based on said first and second desired values.

5. A semiconductor sensor device comprising a plurality of sensor elements, a signal read circuit for reading levels of output signals from said sensor elements to output pixel data for said sensor elements, said signal read circuit having a bias circuit for supplying a bias signal to said output signals, a fixed pattern noise (FPN) correction circuit for correcting said pixel data by using FPN correction data, a first comparator for comparing said pixel data against a specified threshold level to output result signals having "1" or "0", a counter for counting a number of said result signals for said pixel data, and a bias controller for determining said bias signal at a first value so that first said number of said results signals counted based on said first value becomes substantially equal to second said number of said result signals counted based on a second value and a full scale of said FPN correction data.

* * * * *